United States Patent
MacQuin et al.

(10) Patent No.: US 8,997,675 B2
(45) Date of Patent: Apr. 7, 2015

(54) PARAVANE INCREASED LIFT, TOWING SYSTEM AND METHOD

(71) Applicant: CGGVeritas Services SA, Massy Cedex (FR)

(72) Inventors: Raphael MacQuin, Montrouge (FR); Helene Tonchia, Antony (FR); Thierry Grousset, Massy (FR)

(73) Assignee: CGGVeritas Services SA, Massy Cedex (FR)

( * ) Notice: Subject to any disclaimer, the term of this patent is extended or adjusted under 35 U.S.C. 154(b) by 169 days.

(21) Appl. No.: 13/685,778

(22) Filed: Nov. 27, 2012

(65) Prior Publication Data

US 2013/0139742 A1    Jun. 6, 2013

(30) Foreign Application Priority Data

Dec. 1, 2011    (FR) ...................................... 11 61060

(51) Int. Cl.
*B63B 21/66* (2006.01)
*G01V 1/38* (2006.01)

(52) U.S. Cl.
CPC ............... *B63B 21/66* (2013.01); *B63B 21/663* (2013.01); *G01V 1/3817* (2013.01)

(58) Field of Classification Search
CPC ........ B63B 21/66; B63B 21/663; G01V 1/38; G01V 1/3808; G01V 1/3826; G01V 1/3843; G01V 1/3852; G01V 1/3817; G01V 1/38521
USPC ............... 114/244–246, 253, 254; 367/15–24
See application file for complete search history.

(56) References Cited

U.S. PATENT DOCUMENTS

| | | | |
|---|---|---|---|
| 4,756,268 A * | 7/1988 | Gjestrum et al. | 114/242 |
| 4,798,156 A * | 1/1989 | Langeland et al. | 114/242 |
| 5,357,892 A * | 10/1994 | Vatne et al. | 114/244 |
| 5,913,280 A | 6/1999 | Nielsen et al. | |
| 6,234,102 B1 * | 5/2001 | Russell et al. | 114/253 |
| 6,498,768 B1 * | 12/2002 | Gjestrum et al. | 367/20 |
| 7,404,370 B2 | 7/2008 | Stokkeland | |
| 8,100,078 B2 * | 1/2012 | Storteig et al. | 114/246 |
| 2009/0245019 A1 | 10/2009 | Falkenberg et al. | |
| 2010/0149910 A1 | 6/2010 | Martin | |
| 2010/0254216 A1 * | 10/2010 | Toennessen | 367/20 |

FOREIGN PATENT DOCUMENTS

| | | |
|---|---|---|
| GB | 2329369 A | 3/1999 |
| GB | 2488638 A | 9/2012 |
| WO | 03100451 A2 | 12/2003 |
| WO | 2010114865 A2 | 10/2010 |

OTHER PUBLICATIONS

French Preliminary Search Report mailed on Jul. 24, 2012 in related French Application No. 1161060.
GB Search Report mailed Mar. 1, 2013 in related GB Application No. 1221570.3.

* cited by examiner

*Primary Examiner* — Ajay Vasudeva
(74) *Attorney, Agent, or Firm* — Patent Portfolio Builders PLLC

(57) ABSTRACT

A method and a marine towing system for towing streamers or sources. The towing system includes a connecting line; a first paravane connected to the connecting line, wherein the connecting line is configured to connect the first paravane to a vessel; a spur line connected to the first paravane and configured to provide a tension to maintain streamers apart from each other; and a second paravane connected to the connecting line, between the first paravane and the vessel. The second paravane is configured to increase an angle ($\alpha_4$) between the connecting line and the spur line.

20 Claims, 14 Drawing Sheets

PARAVANE INCREASED LIFT, TOWING SYSTEM AND METHOD

TECHNICAL FIELD

Embodiments of the subject matter disclosed herein generally relate to methods and systems and, more particularly, to mechanisms and techniques for increasing a lift applied to a spur line in a marine towing system.

DISCUSSION OF THE BACKGROUND

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which is especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to a surface 14 of the ocean. The streamers may be disposed to have other than horizontal spatial arrangements. The vessel 10 also tows a seismic source array 16 that is configured to generate a seismic wave 18. The seismic wave 18 propagates downward toward the seafloor 20 and penetrates the seafloor until eventually a reflecting structure 22 (reflector) reflects the seismic wave. The reflected seismic wave 24 propagates upward until it is detected by the receiver 11 on the streamer 12. Based on the data collected by the receiver 11, an image of the subsurface is generated by further analyses of the collected data.

The seismic source array 16 includes plural individual source elements. The individual source elements may be distributed in various patterns, e.g., circular, linear, at various depths in the water. FIG. 2 shows a vessel 40 towing two wide tow lines 42 provided at respective ends with paravanes 44. A paravane is a structure that when towed underwater or at the surface of the water provides a lift as will be discussed later. Plural lead-in cables 46 are connected to streamers 50. The plural lead-in cables 46 also connect to the vessel 40. The streamers 50 are maintained at desired separations from each other by separation ropes or spur lines 48. Plural individual source elements 52 are also connected to the vessel 40 and to the lead-in cables 46 via ropes or cables 54.

The paravanes 44 produce a lift, created by their motion through the water, that stretches the spur line 48 so that the streamers 50 are pulled outwardly to maintain their separation relative to the vessel path during the seismic survey. FIG. 3A shows a paravane 44 connected with straps 60 and 62 to a connecting device 64. More than two straps may be used to connect the paravane to the connecting device, for example six straps. The connecting device 64 is also connected to the wide tow line 42 and the spur line 48.

When moving in water, a force 70a appears on the paravane 44, and this force may be decomposed in a drag force 72, which acts as a brake on the towing vessel and a lift 74 that is applied to the separation rope 48 to maintain the streamers 50 separated from each other. To balance this force an equal and opposite force 70 needs to be applied to the connecting device 64 for towing the paravane 44. Corresponding components are present on the connecting device 64, i.e., paravane drag 72a and lift 74a. It is noted that the paravane drag 72a and lift 74a are projections of the total force 70 on the spur line 48 and the wide tow line 42. As the spur line 48 and wide tow line 42 are not perpendicular to each other, lift force 74a is not equal to lift force 74. In other words, the force 70a is decomposed along perpendicular axes A1 and A2 while the opposite force 70 is decomposed on axes B1 and B2, which are not perpendicular to each other.

FIG. 3B shows the same arrangement when an angle between the separation rope 48 and the wide tow line 42 is increased from $\alpha_1$ to $\alpha_2$. It is noted that an increase in the angle between the separation rope 48 and the wide tow line 42 is beneficial as a component of the lift 74a along the separation rope 48 is increased and a force component 76 on the wide tow line is decreased. In other words, total lift is redistributed/transferred from the wide tow line to the separation rope. Thus, force for maintaining the streamers 50 separated from each other is increased, which is desirable for a seismic survey when increasing the size of the spread.

However, due to the hydrodynamic tension 80 acting on the wide tow line 42 while being towed in water, there is a maximum angle between the wide tow line and the separation rope that may be achieved for a given towing system. FIG. 4 shows different wide tow lines/separation ropes configurations 90, 92 and 94 having corresponding angles $\alpha_1$, $\alpha_2$ and $\alpha_3$ with $\alpha_1 < \alpha_2 < \alpha_3$. It is noted that a next configuration 96 has an angle $\alpha_4$ equal to the angle $\alpha_3$ of configuration 94. This means that $\alpha_3$ is a critical angle, i.e., it is not possible to further increase the angle between the separation rope and the wide tow line using conventional towing systems.

FIG. 5 shows a load-sharing tension between the spur line and the wide tow line for various angles. It is noted that the critical angle $\alpha_3$ is reached when tension in the separation rope (curve 100) is not at maximum. Curve 102 indicates the tension in the wide tow line.

Thus, it is desirable to find a way to increase the critical angle for a given towing system so that more lift is available in the separation rope for maintaining the streamers or sources at predetermined positions even if water currents or other factors are present. Accordingly, it would be desirable to provide systems and methods that provide a towing system with an increased critical angle.

SUMMARY

According to an exemplary embodiment, there is a marine towing system for towing streamers or sources. The towing system includes a connecting line; a first paravane connected to the connecting line, wherein the connecting line is configured to connect the first paravane to a vessel; a spur line connected to the first paravane and to the connecting line and configured to provide a tension to maintain streamers apart from each other; and a second paravane connected to the connecting line, at a location between the first paravane and the vessel. The second paravane is configured to increase an angle ($\alpha_4$) between the connecting line and the spur line.

According to another exemplary embodiment, there is a marine towing system for towing streamers or sources. The towing system includes a connecting line; a first paravane connected to the connecting line, wherein the connecting line is configured to connect the first paravane to a vessel; a first spur line connected to the first paravane and to the connecting line and configured to provide a tension to maintain streamers apart from each other; a second paravane connected to the first paravane through a connecting link; and a second spur line connected to the second paravane and configured to provide a further tension to maintain streamers apart from each other. The first and second paravanes are connected through the first and second spur lines to a same connecting device.

According to still another exemplary embodiment, there is a method for towing streamers or sources with a marine towing system. The method includes attaching a first paravane to a first end of a connecting line, wherein the connecting line is configured to connect with a second end to a vessel; attaching a spur line to the first paravane; attaching a second paravane to the connecting line, at a location between the first paravane and the vessel; and adjusting settings of the second paravane to achieve a desired angle ($\alpha_4$) between the connecting line and the spur line.

According to yet another exemplary embodiment, there is a method for towing streamers or sources with a marine towing system. The method includes attaching a first paravane to a first end of a connecting line, wherein the connecting line is configured to connect with a second end to a vessel; attaching a first spur line to the first paravane and to the first end of the connecting line; attaching a second paravane to the first paravane through a connecting link; attaching a second spur line to the second paravane; connecting the first and second spur lines to a connecting device that is configured to connect to a streamer; and adjusting settings of the first and second paravanes to achieve a desired lift on a spread rope connected between the connecting device and an adjacent connecting device.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine towing system having multiple paravanes attached to a single connecting line. However, the embodiments to be discussed next are not limited to a towing system, but may be applied to other seismic elements.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The technologies in marine seismic surveys need a towing system that is capable of applying a desired lift to ropes or cables that separate streamers and/or source arrays. Thus, according to an exemplary embodiment, there is a connecting line that is attached with an end to a vessel and with the other end to a first paravane. For increasing the angle between a spur line that is also attached to the first paravane and the connecting line, a second paravane is attached to the connecting line, between the first paravane and the vessel.

Figure 6:
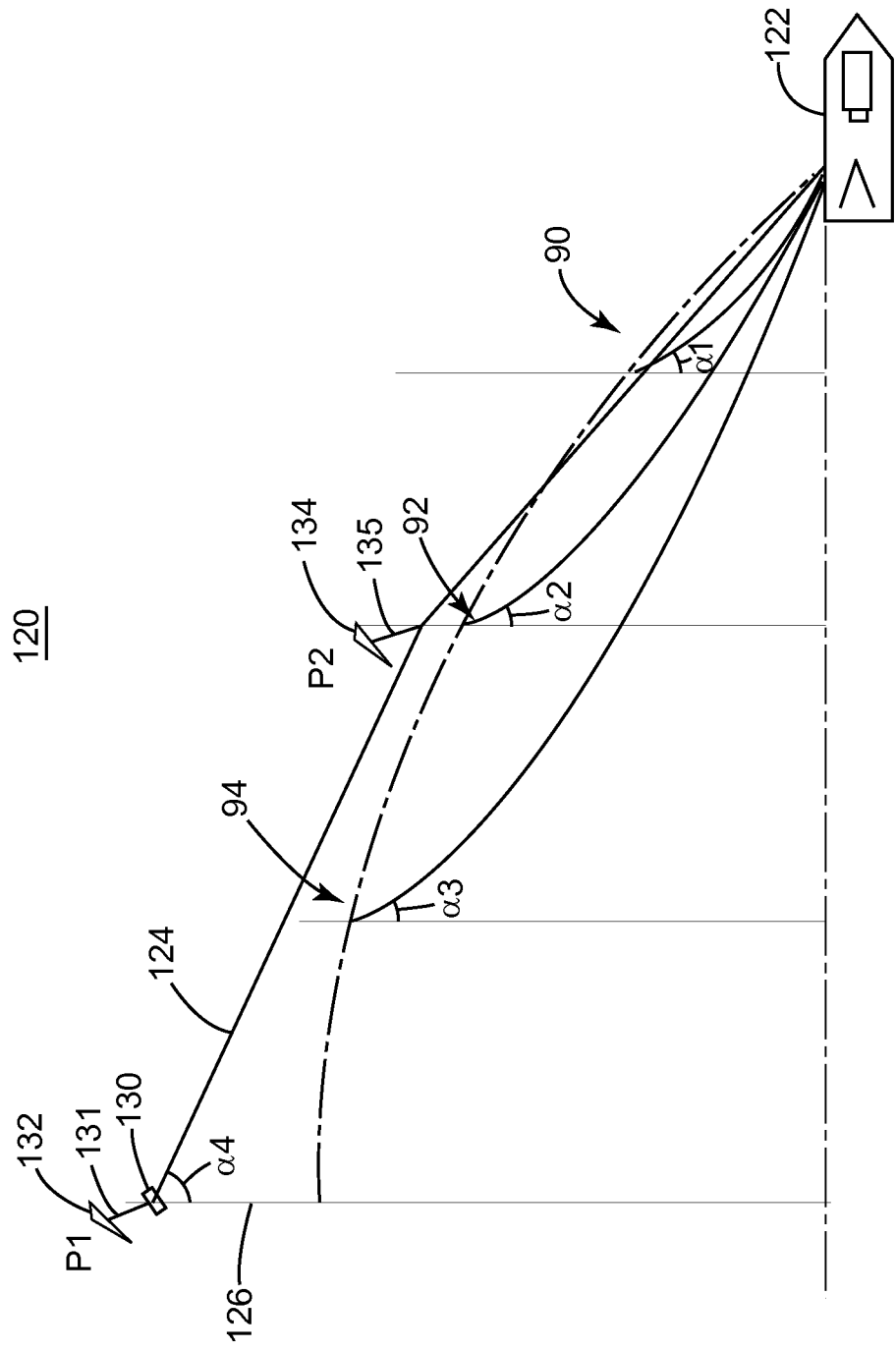
FIG. 6 is a schematic diagram of a towing system having two paravanes attached to a wide tow line according to an exemplary embodiment.
Figure 7:
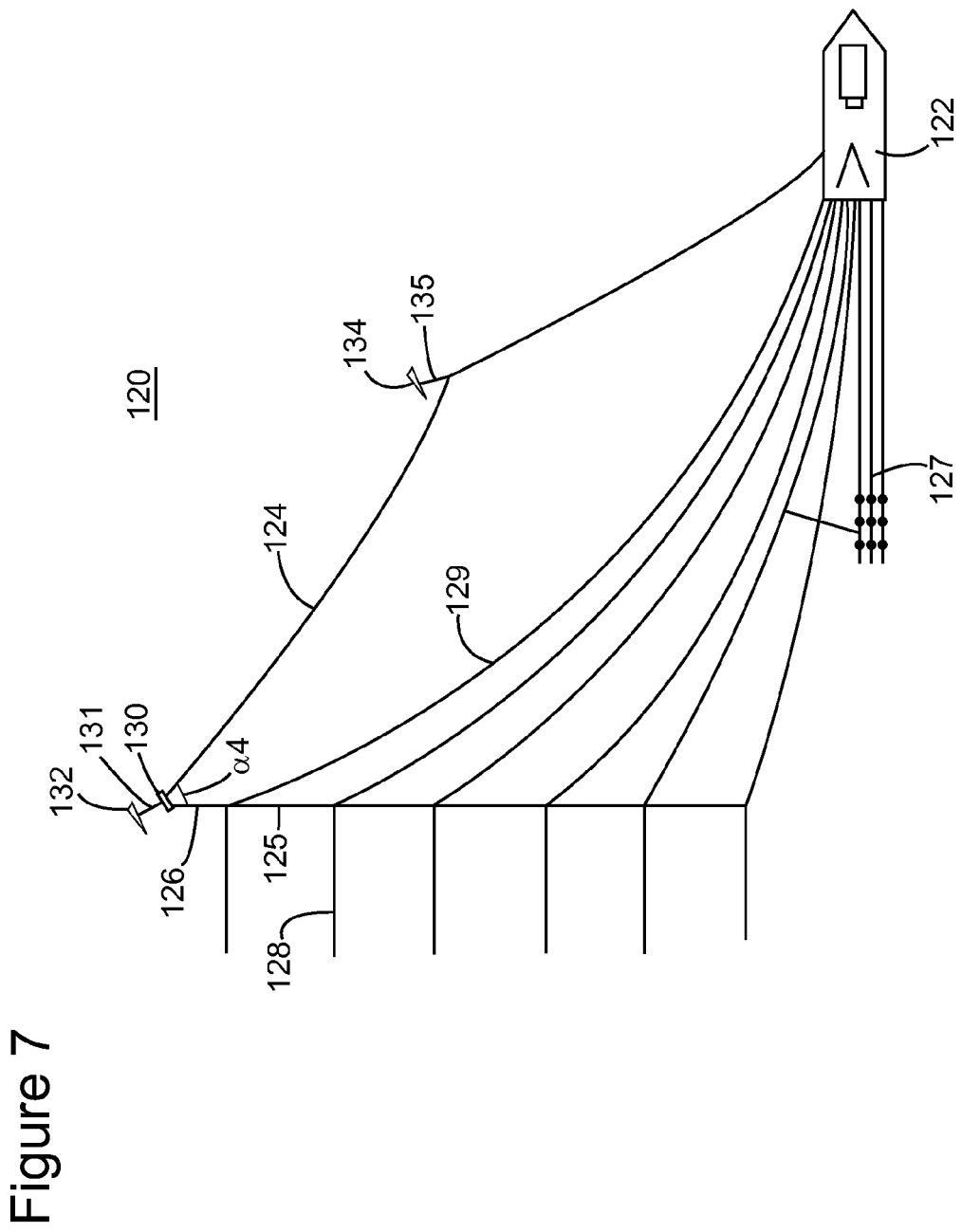
FIG. 7 is a schematic diagram of a towing system having two paravanes attached to a wide tow line according to an exemplary embodiment.

According to an exemplary embodiment illustrated in FIG. 6, there is a towing system 120 that is a towed by a vessel 122. The towing system 120 includes, as shown in FIG. 7, wide tow lines 124, separation ropes 125, spur lines 126, streamers 128, paravanes 132 and 134, lead-ins 129, a source array 127, etc. The wide tow lines and the spur lines may be ropes or cables. A connecting device 130 connects the wide tow line 124 and the spur line 126 to a first paravane 132. More specifically, the connecting device 130 connects the spur line and the wide tow line to one or more straps 131. The one or more straps 131 are connected to the first paravane 132. A second paravane 134 is attached to the wide tow line 124 at a location between the first paravane 132 and the vessel 122. One or more straps 135 may be used to connect the second paravane 134 to the wide tow line 124. Settings of the second paravane 134 (e.g., a position of its wing or wings) may be controlled to adjust (e.g., increases) the angle $\alpha_4$ between the spur line 126 and the wide tow line 124. If this angle is increased, lift that is applied to the spur line 126 is also increased. As will be discussed later, the settings of the second paravane (the same is true for the first paravane) may be controlled by a local controller, or a central controller located on the vessel, or by both of these controllers.

Figure 1:
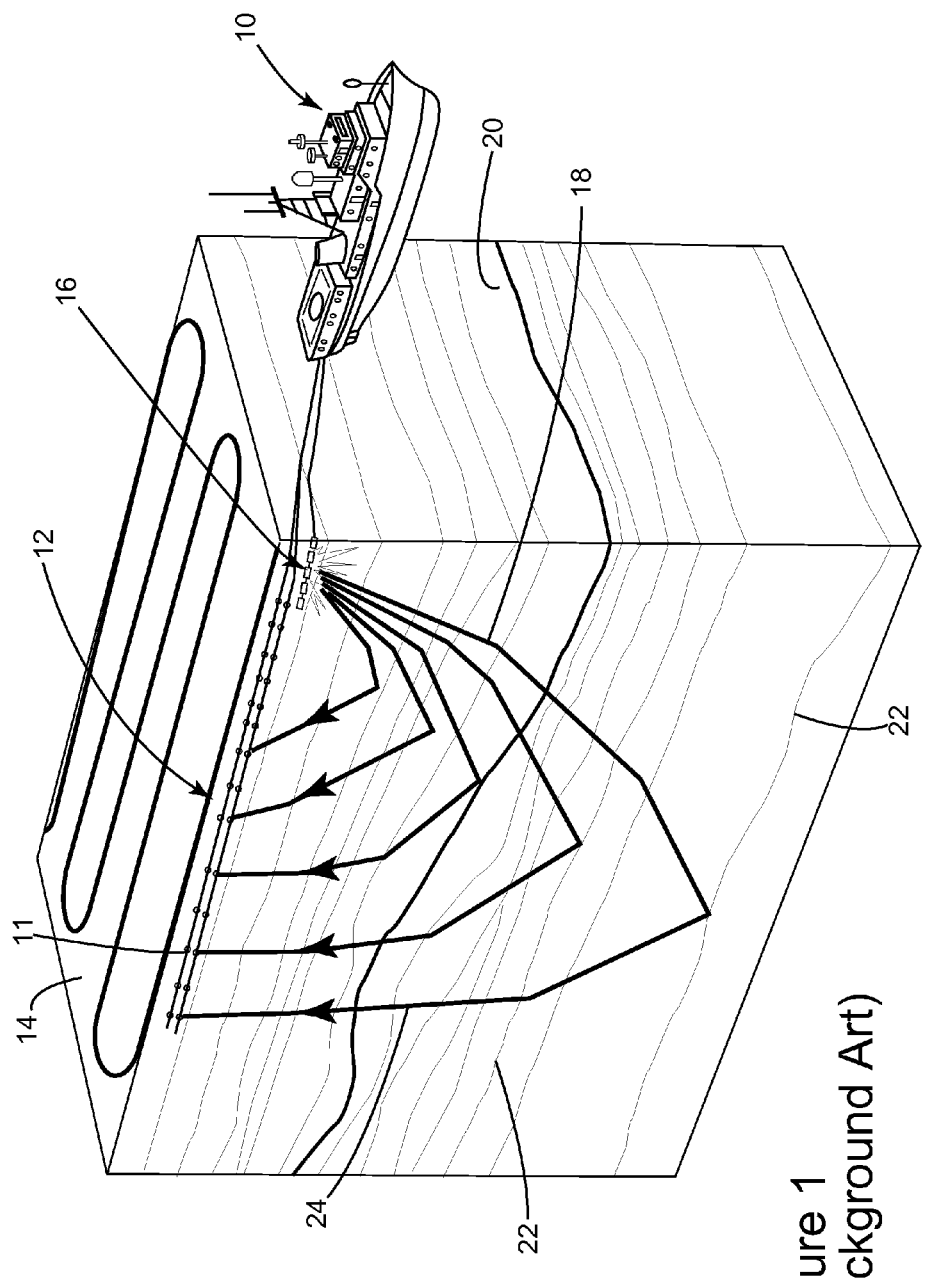
FIG. 1 is a schematic diagram of a conventional seismic survey system.
Figure 2:
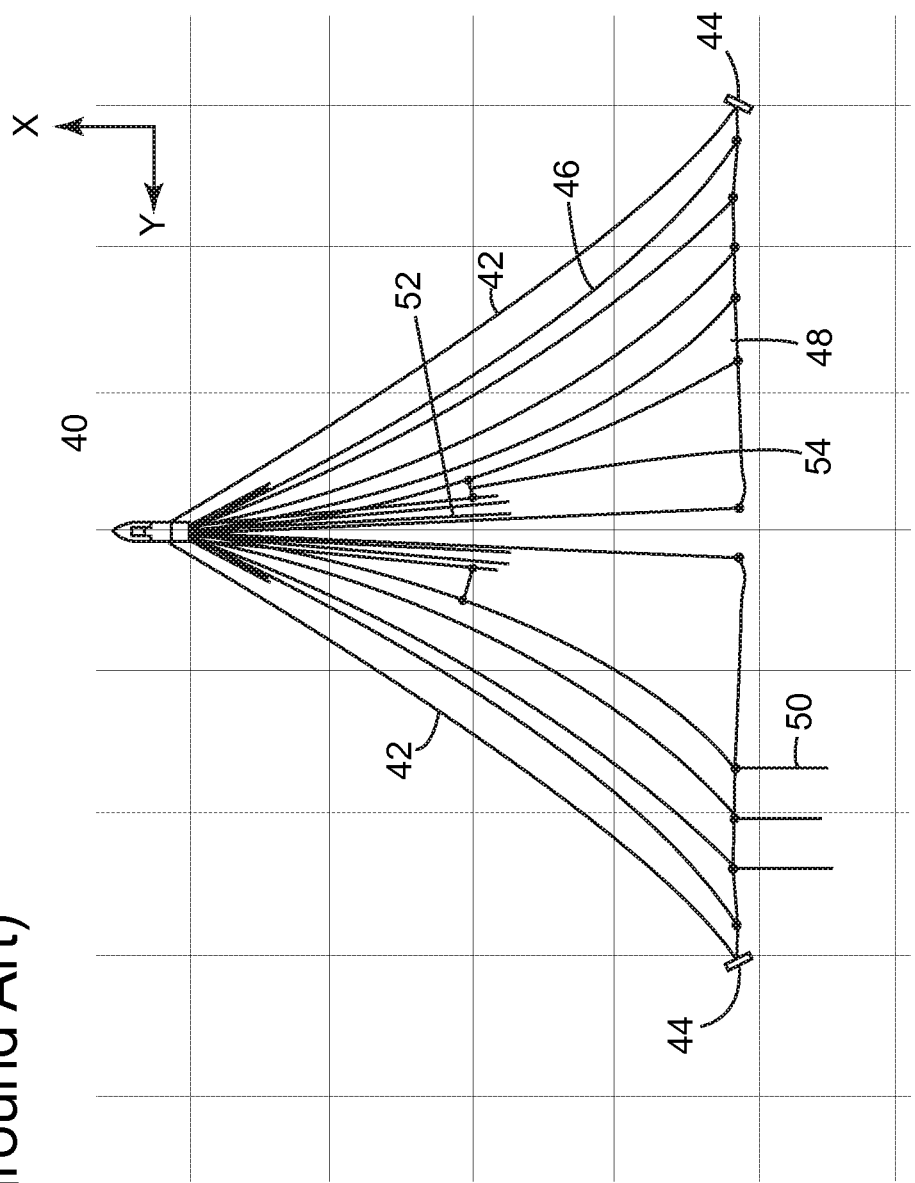
FIG. 2 illustrates a traditional arrangement of streamers and a source array that is towed by a vessel.
Figure 3A:
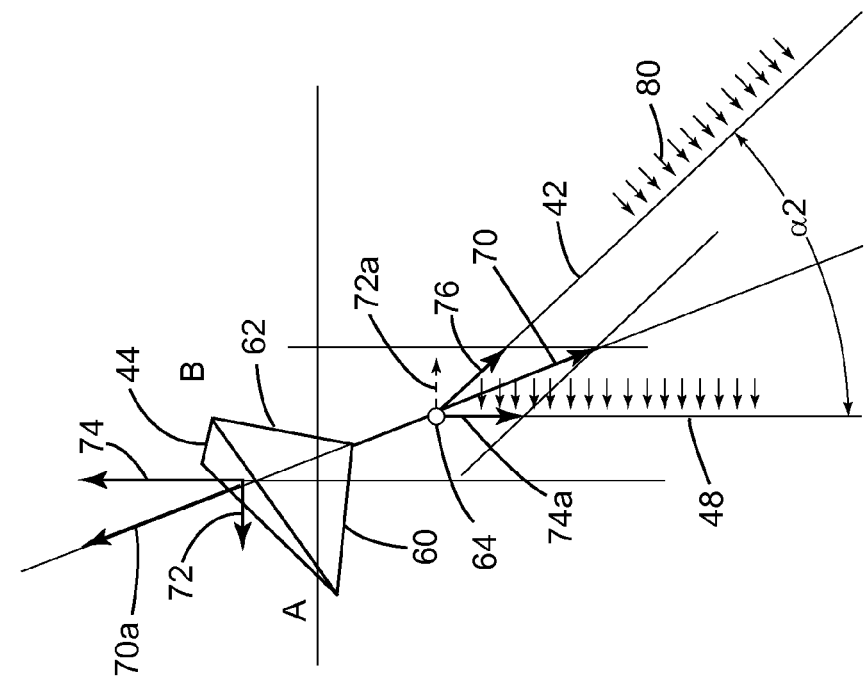
FIGS. 3A and 3B illustrate forces present on a paravane when towed in water.
Figure 3B:
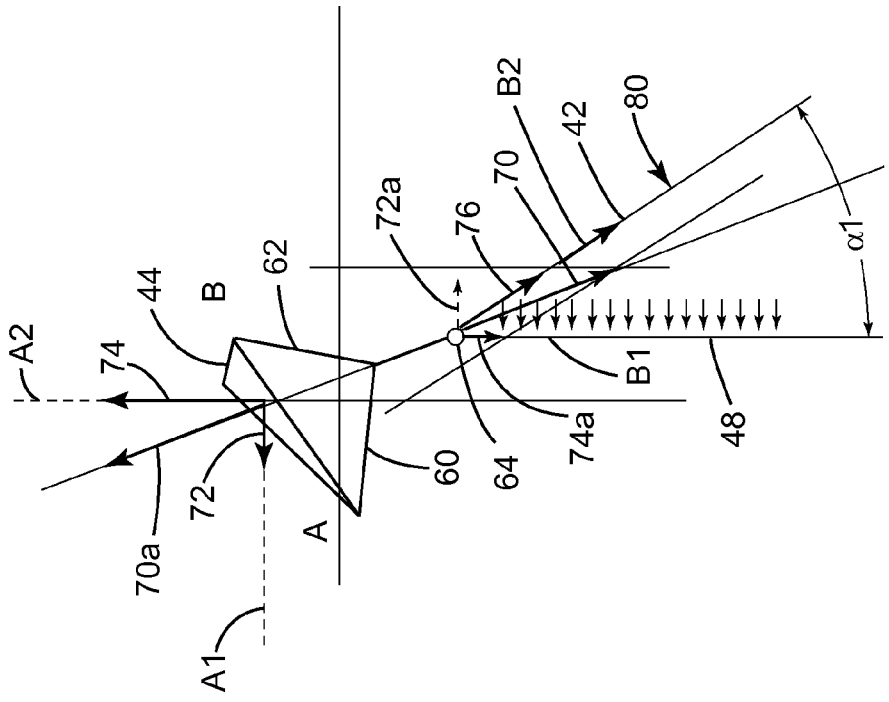
Figure 4:
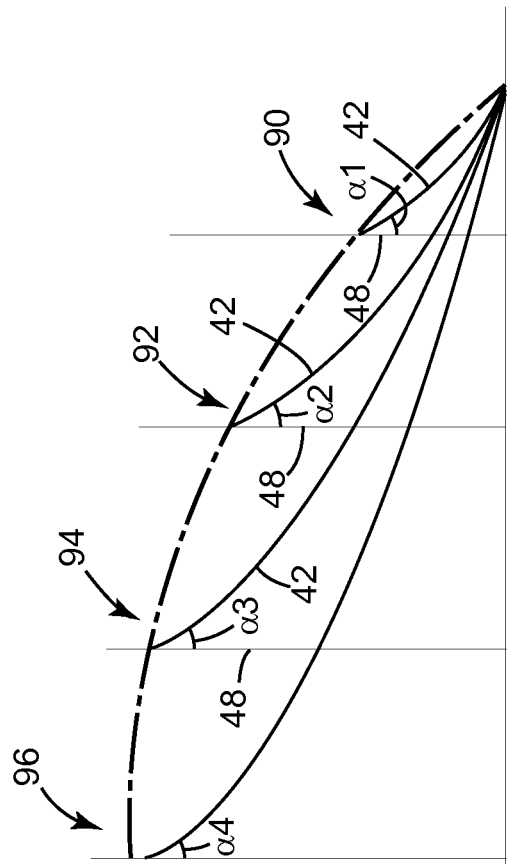
FIG. 4 illustrates a critical angle for a given towing system.
Figure 5:
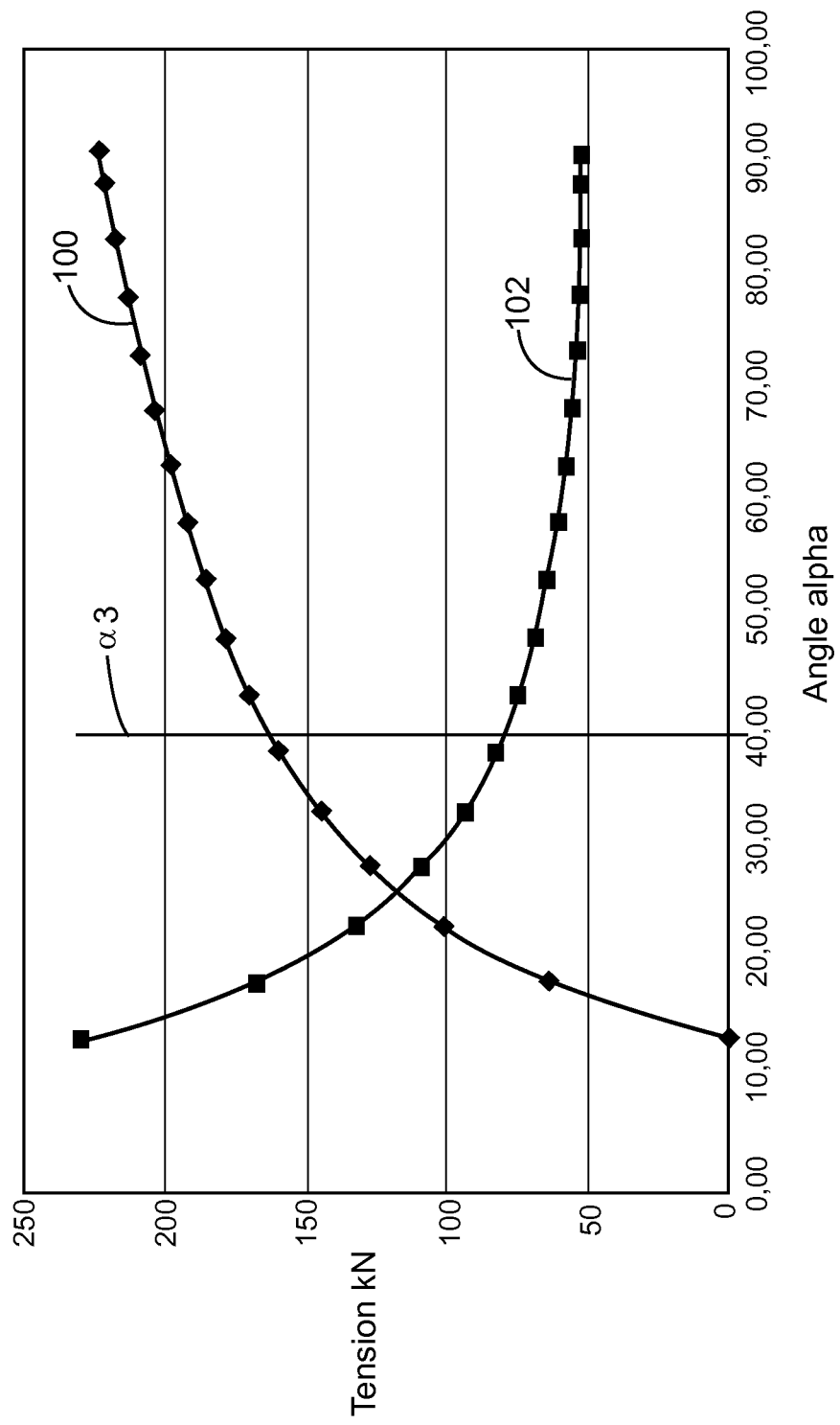
FIG. 5 illustrates a distribution of a lift between a wide tow line and a separation rope.

In one exemplary embodiment, the second paravane 134 is smaller than the first paravane 132 and may have a high efficiency in order to lower the drag on the vessel 122. FIG. 6 shows the novel configuration plotted on the same graph with the traditional configurations 90, 92 and 94 illustrated in FIG. 4. It is noted that the novel configuration has an increased angle $\alpha_4$ comparative to the traditional configurations. Depending on the size of the second paravane 134, the angle $\alpha_4$ may be further increased as desired.

Figure 8:
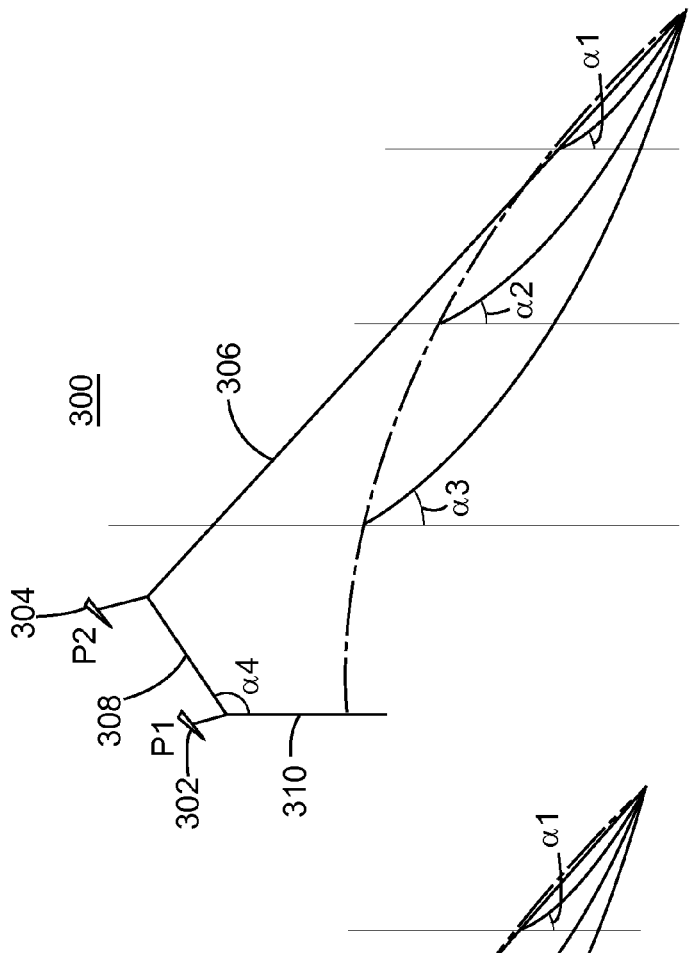
FIG. 8 is a schematic diagram of another towing system having two paravanes attached to a wide tow line according to an exemplary embodiment.

For example, FIG. 8 shows an exemplary embodiment in which a towing system 200 has a first paravane 202 and a second paravane 204 connected to a wide tow line 206. The second paravane 204 is configured so that a part 208 of the wide tow line 206, between the first and second paravanes, makes a substantially right angle (i.e., 90 degrees) with the spur line 210. In this way, all the available lift from the first paravane 202 is transferred to the spur line 210.

Figure 9:
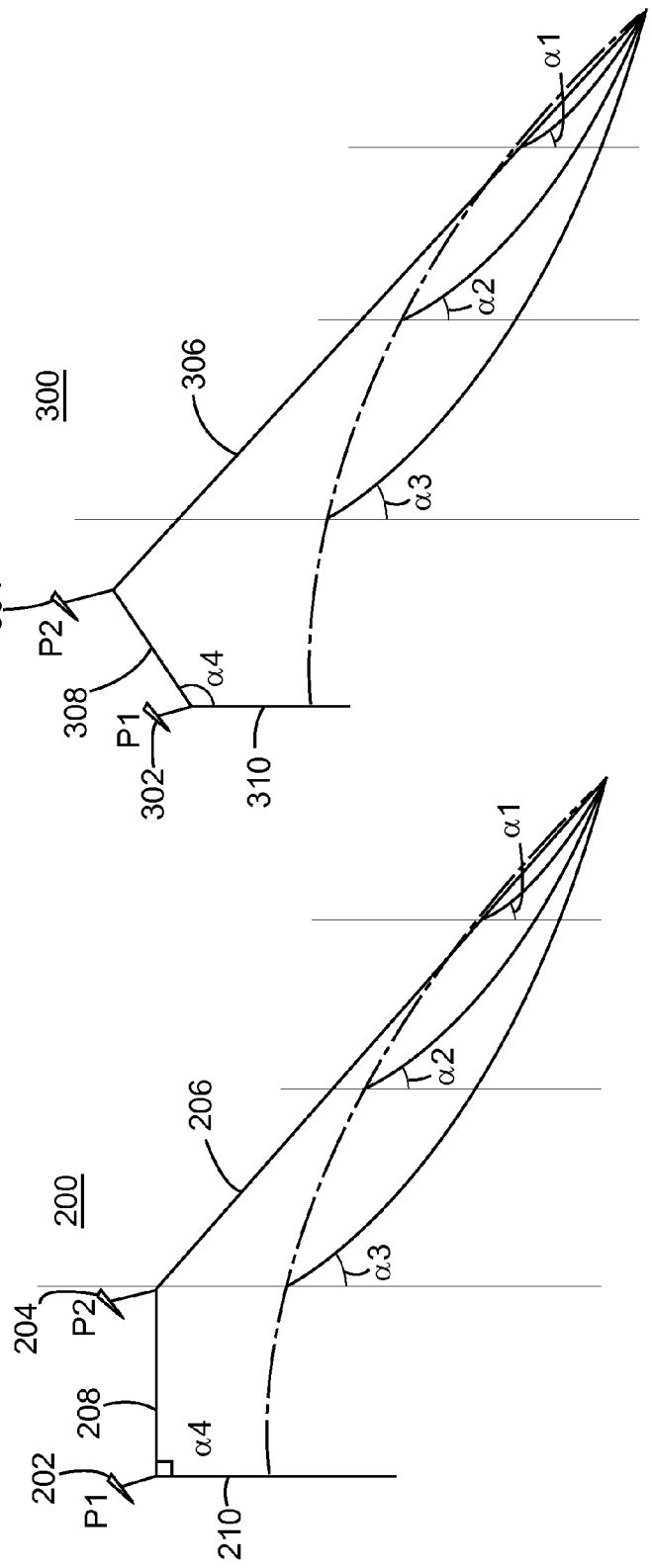
FIG. 9 is a schematic diagram of still another towing system having two paravanes attached to a wide tow line according to an exemplary embodiment.

In another exemplary embodiment illustrated in FIG. 9, a towing system 300 has a first paravane 302 and a second paravane 304 connected to the wide tow line 306. The second paravane 304 is configured so that a part 308 of the wide tow line 306 makes an angle larger than 90 degrees with the spur line 310. In this case, all the lift from the first paravane 302 and part of the lift available from the second paravane 304 are transferred to the spur line 310.

Figure 10:
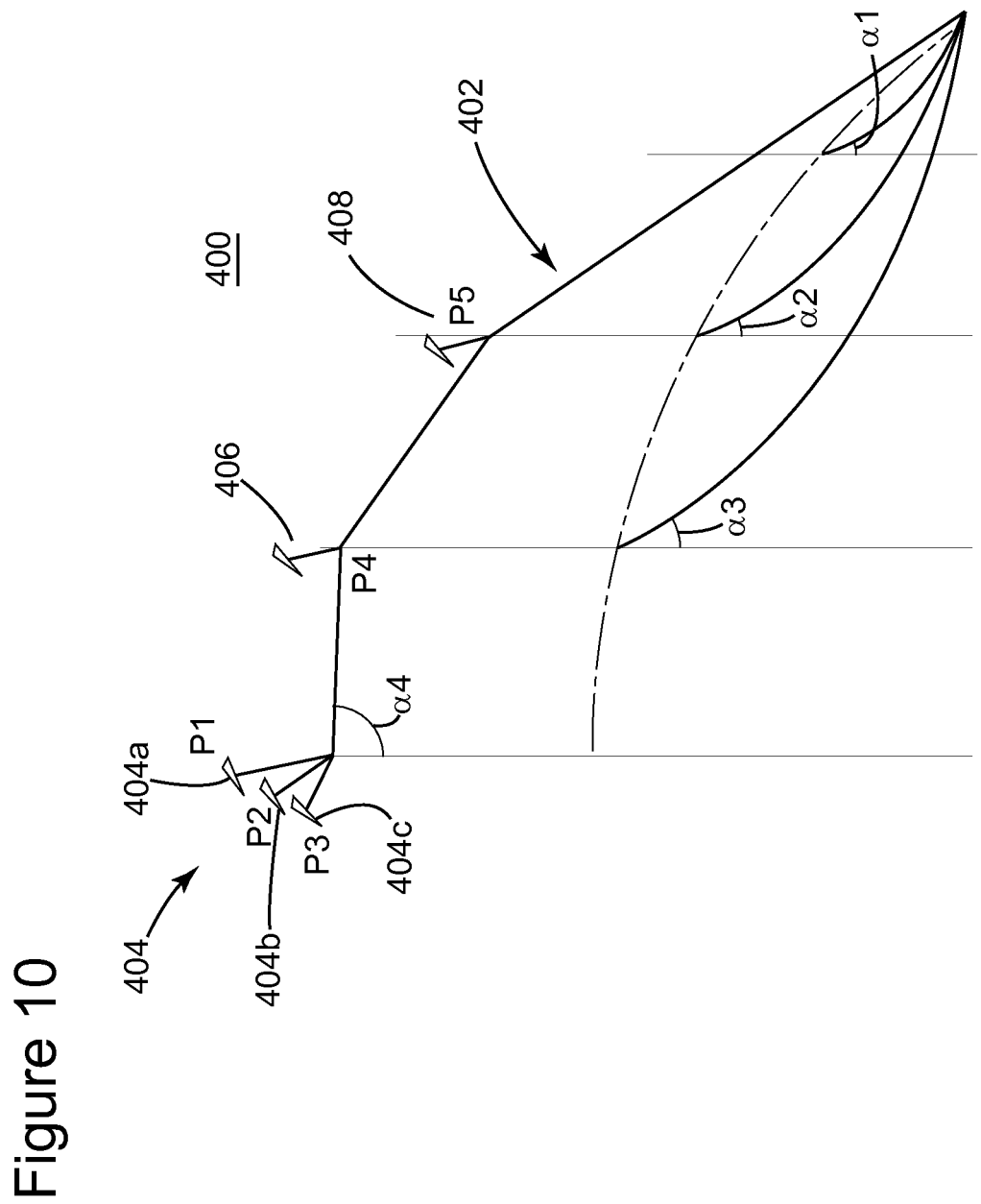
FIG. 10 is a schematic diagram of a towing system having a cluster of paravanes attached to a wide tow line according to an exemplary embodiment.

In still another exemplary embodiment, which is illustrated in FIG. 10, a towing system 400 includes a cluster of paravanes instead of the first paravane. More specifically, the towing system includes a wide tow line 402 to which is attached a cluster of paravanes 404. The cluster of paravanes may be attached to one end of the wide tow line 402. Another end of the wide tow line may be attached to the vessel. The cluster of paravanes may include two or more individual paravanes. FIG. 10 shows three paravanes 404*a*, 404*b* and 404*c*. A second paravane 406 may be attached to the wide tow line 402 to control the angle between the wide tow line and the spur line. However, in this embodiment, a third paravane 408 may be added to optimize the angle between the wide tow line and the spur line and, thus, to optimize lift available from the cluster of paravanes. The third paravane 408 may be added at a location between the second paravane 406 and the vessel. More paravanes may be added.

Figure 11:
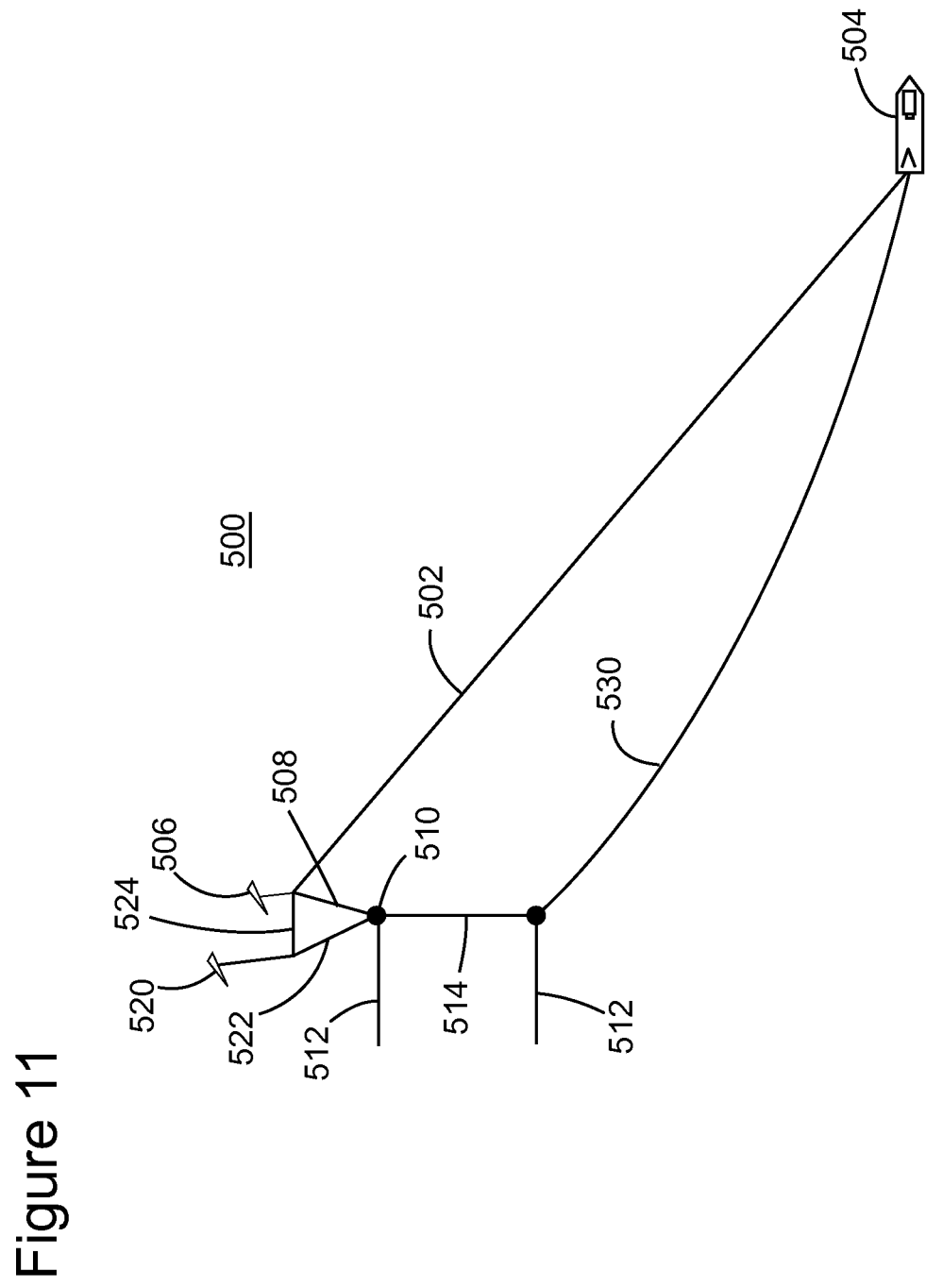
FIG. 11 is a schematic diagram of a towing system having two paravanes attached with spur lines to an end of a wide tow line according to an exemplary embodiment.

FIG. 11 shows another possible embodiment for a towing system 500. FIG. 11 shows a wide tow line 502 being attached between a vessel 504 and a first paravane 506. The first paravane 506 is also attached to a connecting device 510 by a first spur line 508. A streamer 512 and a spread rope 514 are attached to the connecting device 510. A second paravane 520 is attached through a second spur line 522 to the connecting device 510. The second paravane 520 is connected to the first paravane 506 through a connection line 524. A lead-in 530 may connect the connecting device 510 to the vessel 504.

This double spur line solution advantageously allows increased lift, created by two paravanes (506 and 520), to be applied to the spread rope 514. Thus, settings of the first and second paravanes may be adjusted so that lift applied to the spread rope 514 is maximized or has a desired value. It is noted that multiple spread ropes are present in the towing system, one between each pair of adjacent streamers. The figures show a single spread rope for simplicity.

Figure 12:
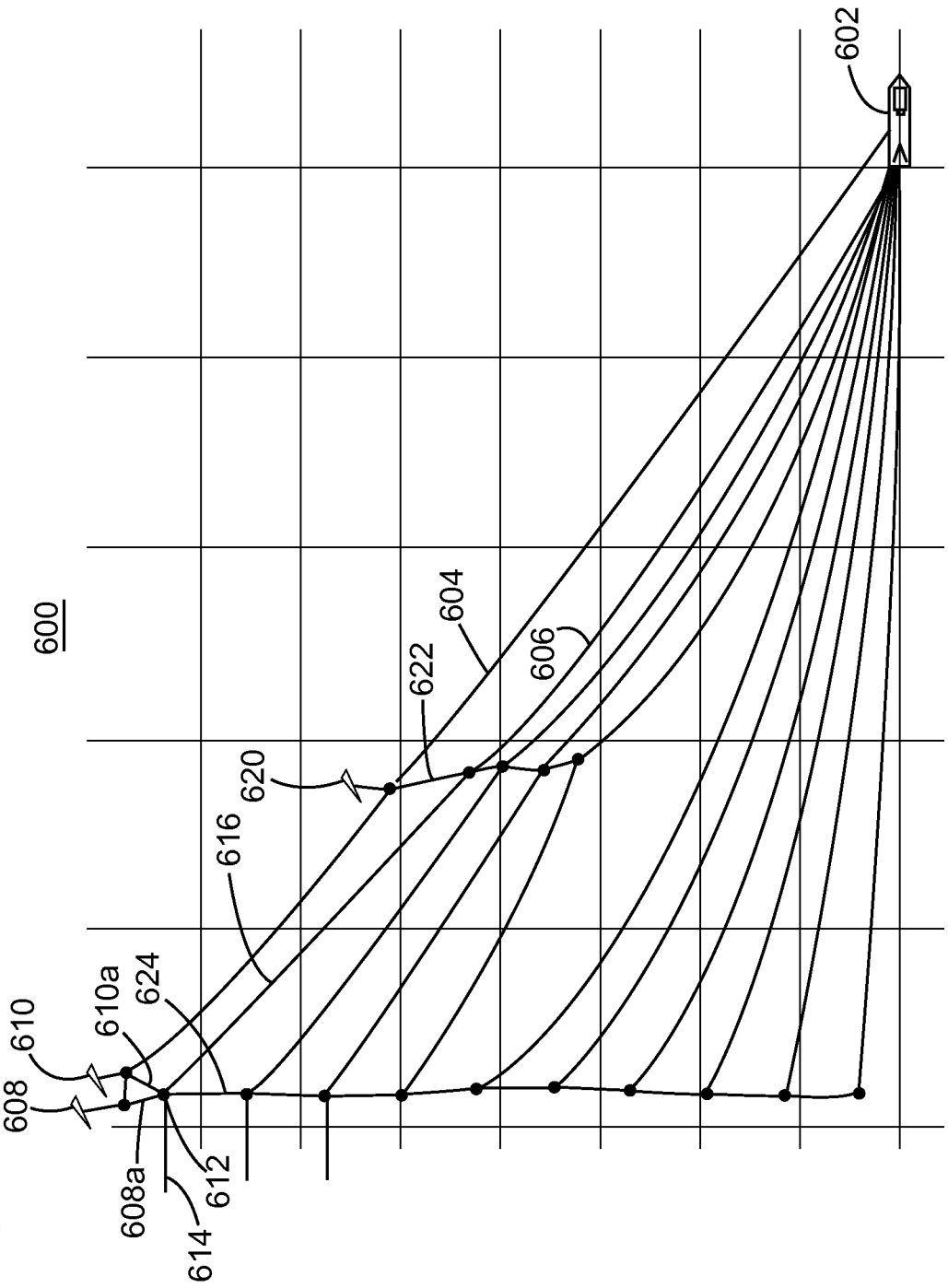
FIG. 12 is a schematic diagram of a towing system having more than two paravanes attached to a wide tow line according to an exemplary embodiment.

The configuration illustrated in the exemplary embodiment of FIG. 11 may be extended by adding a third paravane as shown in FIG. 12. FIG. 12 shows a towing system 600 that includes a vessel 602 that pulls a wide tow line 604 and lead-ins 606. A first paravane 608 is connected through a first spur line 608*a* to a connecting device 612. A second paravane 610 is connected through a second spur line 610*a* to the connecting device 612. The connecting device 612 connects a streamer 614 to a corresponding lead-in 616.

A third paravane 620 is attached to the wide tow line 604 and also to at least one adjacent lead-in 616 through a connecting line 622. In this case, the angle between the lead-in 616 and a spread rope 624 is also increased. Thus, this exemplary embodiment advantageously increases not only the lift applied to the spread ropes but also the towing force applied to the streamer.

Figure 13:
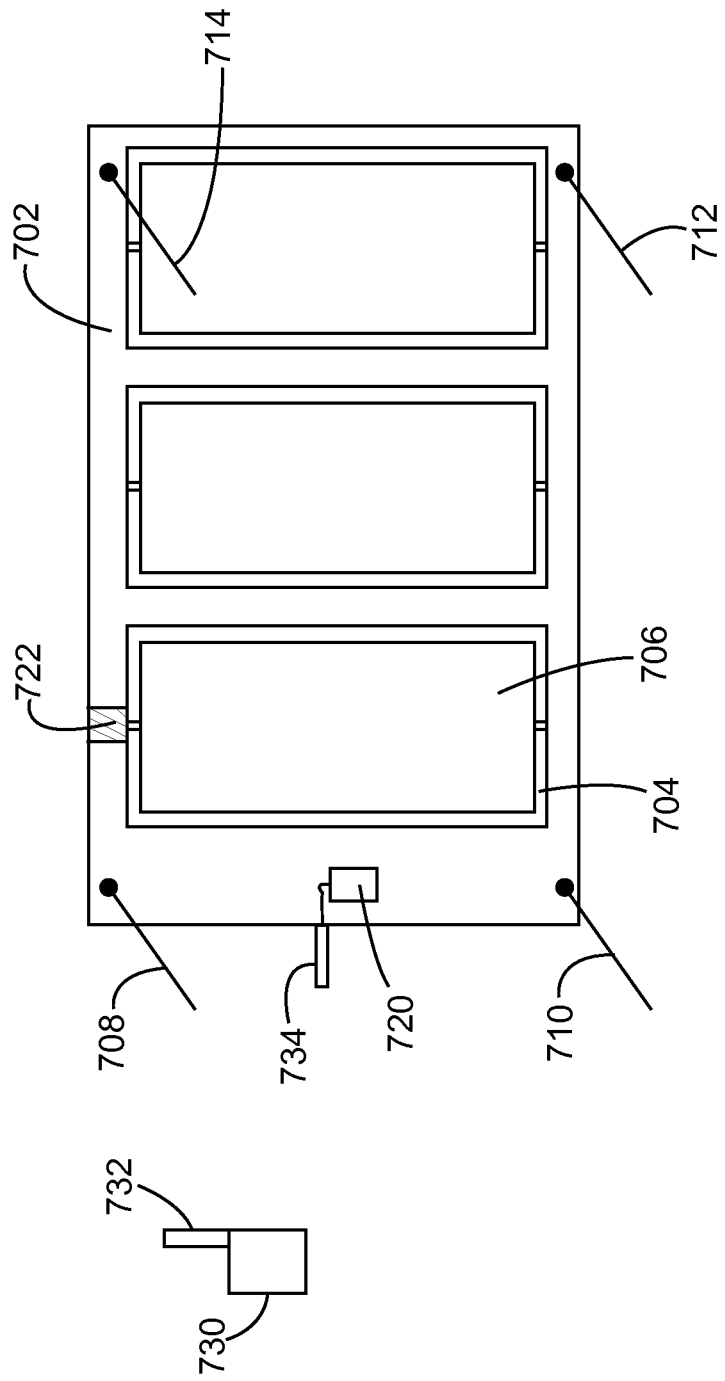
FIG. 13 is a schematic diagram of a paravane.

Because the above-noted exemplary embodiments use one or more paravanes, it is believed to be appropriate to provide an exemplary structure of a paravane. FIG. 13 shows such a paravane 700 having a body 702 that is configured to float or not in water. The body 702 may have one or more openings 704 in which wings 706 are located. The wings 706 are configured to rotate relative to the openings 704. One or more straps 708, 710, 712 and 714 may be attached to the body 702 of the paravane and further to a connecting device, as shown, for example, in the previous figures.

The paravane may be passive or active. A passive paravane has the wings fixed, i.e., adjusted before being deployed in the water. An active paravane has controllable wings. Rotations of the wings 706 may be controlled by a local control unit 720, which is configured to actuate, for example, a motor 722 connected to the wing. Alternatively, the rotations of the wings may be controlled from the vessel by a central control unit 730. In this case, the central control unit 730 is either wired to the local control unit 720 for providing rotating commands or sends the commands wireless through an antenna 732 to a corresponding antenna 734 located on the paravane 700.

The towing systems of the above-noted exemplary embodiments may be driven according to multiple methods. Two methods are discussed next, but they are exemplary and not intended to limit the invention.

Figure 14:
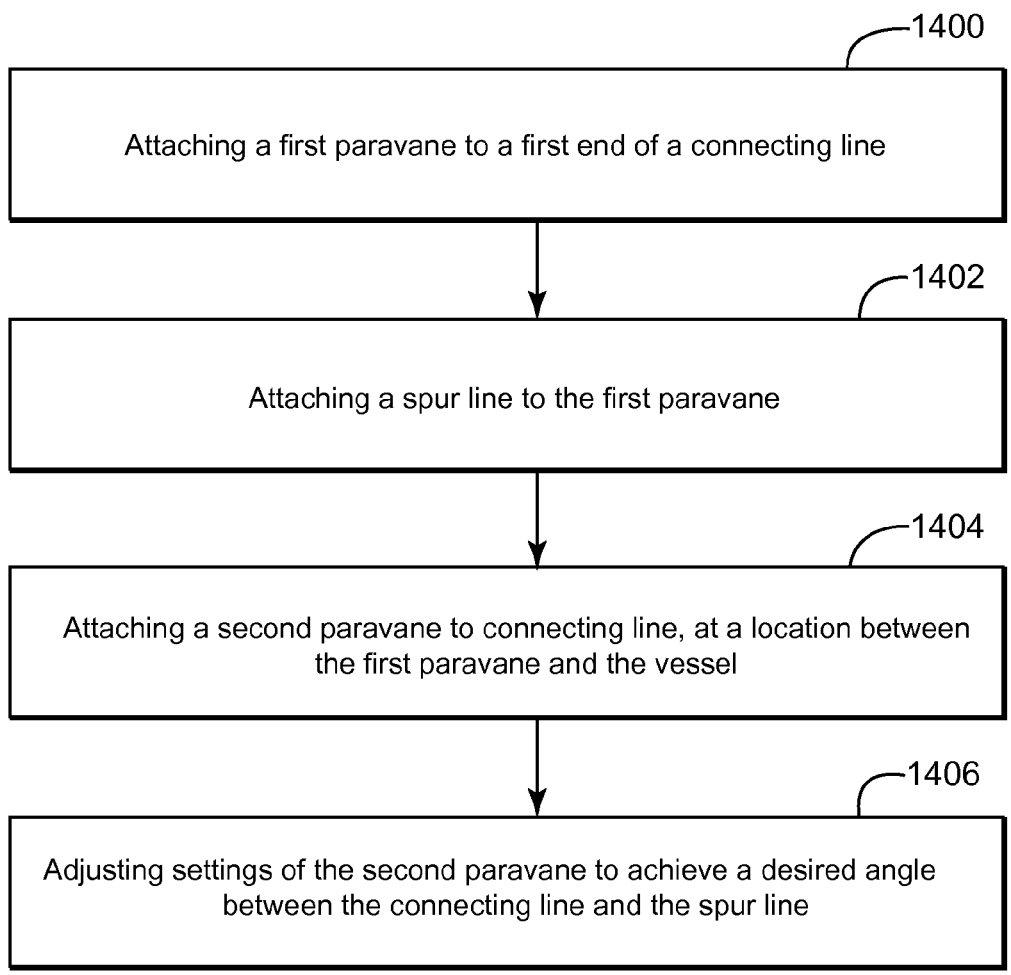
FIG. 14 is a flowchart of a method for adjusting an angle between a connecting line and a spur line according to an exemplary embodiment.

According to an exemplary embodiment illustrated in FIG. 14, there is a method for towing streamers or sources with a marine towing system. The method includes a step 1400 of attaching a first paravane to a first end of a connecting line, wherein the connecting line is configured to connect with a second end to a vessel; a step 1402 of attaching a spur line to the first paravane; a step 1404 of attaching a second paravane to the connecting line at a location between the first paravane and the vessel; and a step 1406 of adjusting settings of the second paravane to achieve a desired angle ($\alpha_4$) between the connecting line and the spur line.

Figure 15:
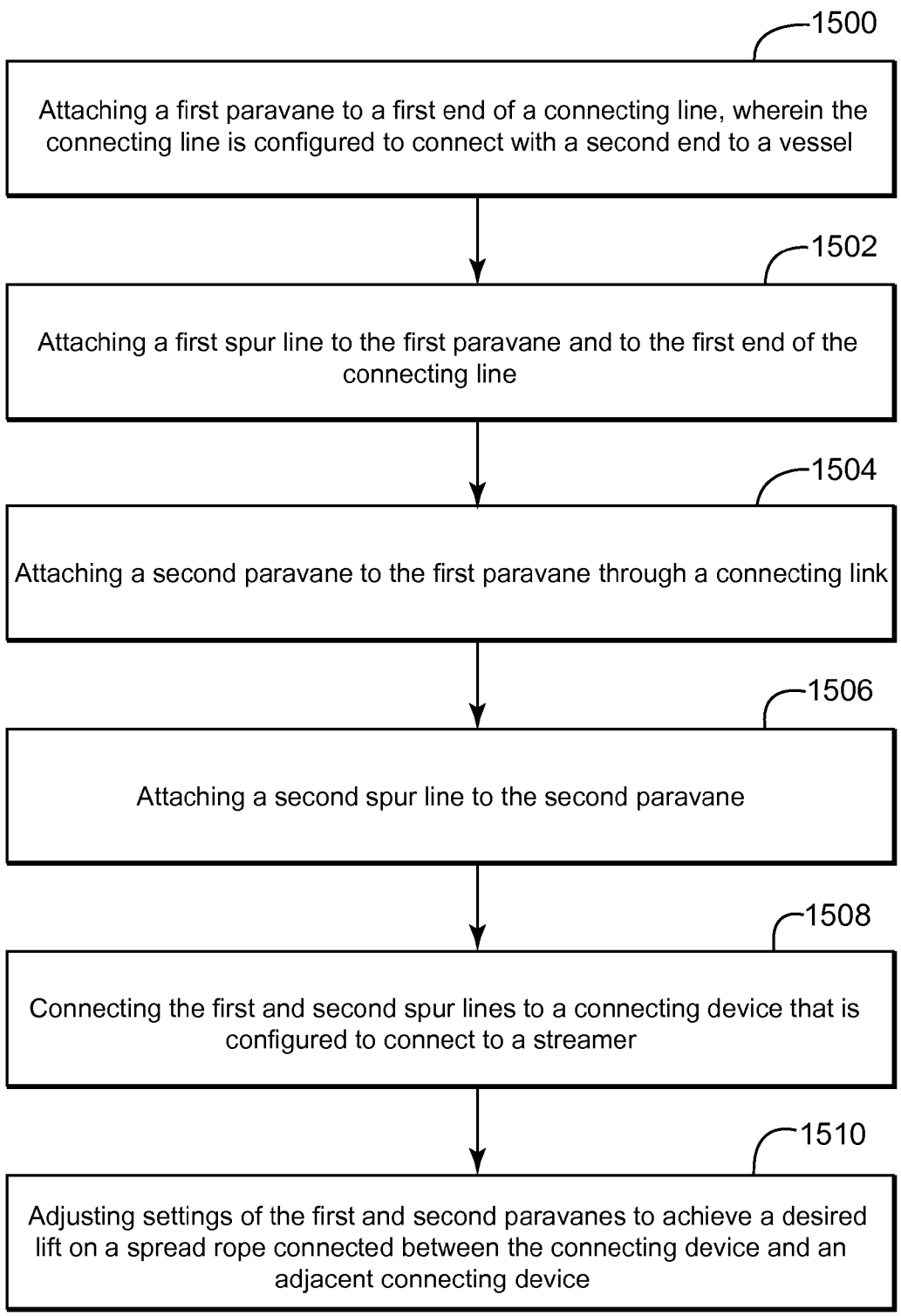
FIG. 15 is a flowchart of a method for towing streamers or sources with a cluster of paravanes according to an exemplary embodiment.

According to an exemplary embodiment illustrated in FIG. 15, there is a method for towing streamers or sources with a marine towing system. The method includes a step 1500 of attaching a first paravane to a first end of a connecting line, wherein the connecting line is configured to connect with a second end to a vessel; a step 1502 of attaching a first spur line to the first paravane and to the first end of the connecting line; a step 1504 of attaching a second paravane to the first paravane through a connecting link; a step 1506 of attaching a second spur line to the second paravane; a step 1508 of connecting the first and second spur lines to a connecting device that is configured to connect to a streamer; and a step 1510 of adjusting settings of the first and second paravanes to achieve the desired lift on a spread rope connected between the connecting device and an adjacent connecting device.

One or more of the exemplary embodiments discussed above provide a towing system that controls the lift applied on a spread rope by adjusting the angle between the spur line and wide tow line. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine towing system for towing streamers or sources, the towing system comprising:
    a connecting line connected to a connecting device;
    a first paravane connected to the connecting line through the connecting device, wherein the connecting line is configured to connect the first paravane to a vessel;
    a spur line connected to the first paravane and to the connecting line through the connecting device such that the spur line is located between the connecting device and heads of streamers, and the spur line is configured to provide a tension to maintain the heads of the streamers apart from each other; and
    a second paravane connected to the connecting line, at a location between the first paravane and the vessel,
    wherein the second paravane is configured to increase an angle ($\alpha_4$) between the connecting line and the spur line.

2. The towing system of claim 1, wherein the connecting device connects together the first paravane, the spur line and the connecting line.

3. The towing system of claim 2, further comprising:
    one or more straps connecting the first paravane to the connecting device.

4. The towing system of claim 1, wherein the connecting line is a rope.

5. The towing system of claim 1, wherein the first and second paravanes have a wing that is configured to rotate to change an orientation of the first and second paravanes.

6. The towing system of claim 1, wherein the second paravane is configured to make the angle ($\alpha_4$) substantially 90 degrees or larger.

7. The towing system of claim 1, further comprising:
    a third paravane attached to the connecting line and located between the second paravane and the vessel.

8. The towing system of claim 1, wherein the first paravane includes a cluster of individual paravanes.

9. A marine towing system for towing streamers or sources, the towing system comprising:
    a connecting line;
    a first paravane connected to the connecting line, wherein the connecting line is configured to connect the first paravane to a vessel;
    a first spur line connected between the first paravane and a connecting device and configured to provide a tension to maintain streamers apart from each other;
    a second paravane connected to the first paravane through a connecting link; and
    a second spur line connected between the second paravane and the connecting device and configured to provide a further tension to maintain the streamers apart from each other,
    wherein the connecting device is connected to the streamers.

10. The towing system of claim 9, wherein a head of a streamer is configured to connect to the connecting device.

11. The towing system of claim 9, further comprising:
    a lead-in connected between the connecting device and the vessel.

12. The towing system of claim 9, further comprising:
    a third paravane attached to the connecting line and located between the first paravane and the vessel.

13. The towing system of claim 12, further comprising:
    a connecting line configured to connect the third paravane and the connecting line to a lead-in.

14. The towing system of claim 13, wherein the connecting line is configured to extend to plural lead-ins.

15. A method for towing streamers or sources with a marine towing system, the method comprising:
    attaching a first paravane to a first end of a connecting line through a connecting device, wherein the connecting line is configured to connect with a second end to a vessel;
    attaching a spur line to the first paravane through the connecting device such that the spur line is located between the connecting device and heads of streamers;
    attaching a second paravane to the connecting line, at a location between the first paravane and the vessel; and
    adjusting settings of the second paravane to achieve a desired angle ($\alpha_4$) between the connecting line and the spur line.

16. The method of claim 15, further comprising:
    attaching supplementary paravanes to the first end of the connecting line.

17. The method of claim 15, further comprising:
    attaching a third paravane to the connecting line, at a location between the second paravane and the vessel.

18. A method for towing streamers or sources with a marine towing system, the method comprising:
    attaching a first paravane to a first end of a connecting line, wherein the connecting line is configured to connect with a second end to a vessel;
    attaching a first spur line between the first paravane and a connecting device and connecting the first spur line to the first end of the connecting line;
    attaching a second paravane to the first paravane through a connecting link;
    attaching a second spur line between the second paravane and the connecting device;
    connecting the connecting device to a streamer; and
    adjusting settings of the first and second paravanes to achieve a desired lift on a spread rope connected between the connecting device and an adjacent connecting device.

19. The method of claim 18, further comprising:
    attaching a lead-in to the adjacent connecting device, wherein the lead-in is connected with one end to the vessel.

20. The method of claim 18, further comprising:
attaching a third paravane to the connecting line, at a location between the first paravane and the vessel; and
connecting the third paravane to a lead-in through a connecting line.

* * * * *